Feb. 11, 1947. E. C. EARHART 2,415,582
ELECTRICAL COIL AND METHOD OF MAKING THE SAME
Filed Jan. 11, 1945

INVENTOR
E.C. EARHART
BY E. R. Nowlan.
ATTORNEY

Patented Feb. 11, 1947

2,415,582

UNITED STATES PATENT OFFICE 2,415,582

ELECTRICAL COIL AND METHOD OF MAKING THE SAME

Edward C. Earhart, Cranford, N. J., assignor to Western Electric Company, Incorporated, New York, N. Y., a corporation of New York Application January 11, 1945, Serial No. 572,286

9 Claims. (Cl. 201—63)

This invention relates to an electrical coil and a method of making the same, and more particularly to an electrical coil having the turns of each layer of a multi-layered winding laid therein with unusually accurate maintenance throughout of relative position and to a method of winding such coils.

In the electrical arts, coils comprising an insulated electrical conductor wound in superimposed layers of consecutive helical turns upon a generally spool shaped supporting member and between the flanges thereof, have innumerable applications. In many instances, the exact relative position of the juxtaposed turns may not be of crucial importance, e. g. in coils whose primary function is to utilize the summated induction of the turns to produce an electrical field within the axial space surrounded by the coil. There are other cases, however, where the mutual spatial relation of juxtaposed turns is a chief characteristic of the coil. Thus, where a coil is to provide predetermined resistance with minimum inductance, half the turns of the winding must be opposed to the equal other half of the turns in direction, i. e. the inductive effect of each turn must be balanced against and nullified as nearly as possible by an equal and oppositely directed turn. The simplest way to ensure this is to wind the coil with an even number of layers of winding having the same number of turns in each layer and with alternate layers wound in opposite directions. It is a relatively simple matter to wind such a coil except as to the matter of reversing the direction of the conductive strand in passing from one layer of the winding to the next. At each such point the strand is doubled back on itself and the apex of the loop formed in doing this must be anchored firmly in place, longitudinally of itself to withstand the tension caused by the winding process and transversely of itself to prevent misplacement of ensuing neighboring turns both beside and over the loop of reversal. Furthermore, the anchoring means must also be the cause of only negligible misplacement of ensuing turns.

An object of the present invention is to provide a structure of and a method of making electrical coils having in the windings thereof one or more reversals of direction of winding which shall produce a coil having a maximum of uniformity of winding with a minimum of difficulty in the process of winding.

With the above and other objects in view, the invention may be embodied in an electrical coil comprising a support for a winding, and a multi-layered winding of a conductive strand on the support, in combination with a binding tape disposed radially at one end of the winding and passing sinuously around and between radially superimposed turns of consecutive layers of winding in alternately oppositely facing loops.

Other objects and features of the invention will appear from the following detailed description of one embodiment thereof, taken in connection with the accompanying drawing, in which the same reference numerals are applied to identical parts in the several figures, and in which Fig. 1 is a broken axial sectional view of a spool prepared to be wound to make a coil in accordance with the invention;

Figure 1:
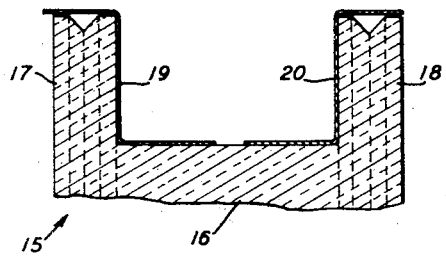

As herein disclosed, the invention is illustrated in the method of winding and in the structure of a resistance coil. A spool, generally indicated at 15 and having a cylindrical barrel 16 and flanges 17 and 18, is provided to receive and support the winding. In preparation for winding, two strips 19 and 20 of thin flexible material, coated with a suitable adhesive substance are applied along the barrel and over the flanges of the spool as indicated in Fig. 1. These could equally well be a single strip; but if the spool be a long one, there is no need for more than is shown in the two pieces illustrated.

Figure 2:
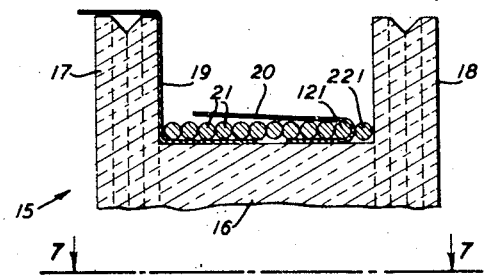
Fig. 2 is a similar view thereof in an early stage of winding.
Figure 3:
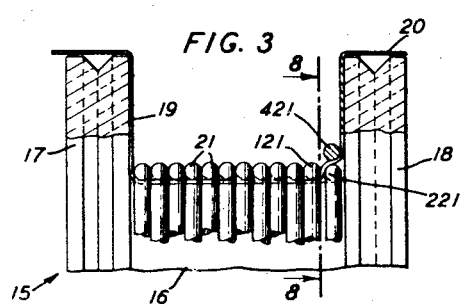
Fig. 3 is a similar view thereof in a more advanced stage.
Figure 7:
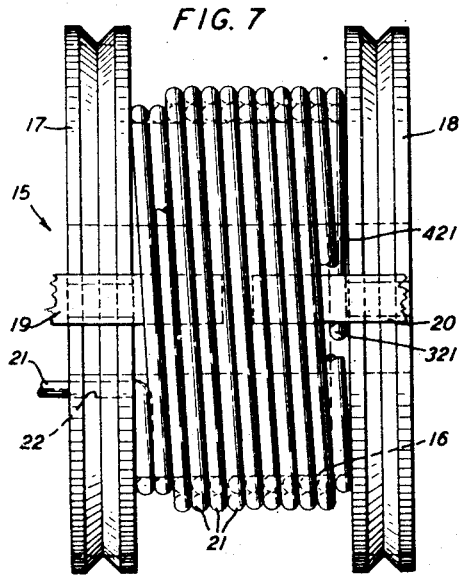
Fig. 7 is a complete plan view of the stage shown in Fig. 4.
Figure 8:
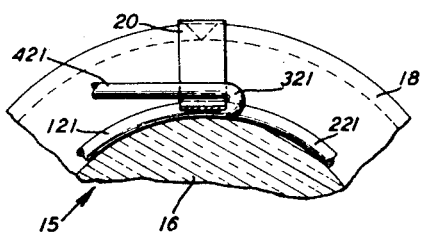
Fig. 8 is a broken view on the line 8—8 of Fig. 3.

In one of the flanges, e. g. the left flange 17 as shown, there is a transverse bore 22 through which an end of the strand 21 is threaded, as shown in Fig. 7 to begin the winding. Beginning then from the right end of the bore 22, the strand is wound counterclockwise as seen from the right, in smoothly juxtaposed turns advancing helically along the barrel from left to right until the next to the last turn leaves just room between itself and the flange 18 for the last turn. The tape 20 is then brought from the position of Fig. 1 to that shown in Fig. 2 and the last turn 221 of the winding is laid on as in Fig. 2. The tape 20 is then swung up again over the turn 221 and up along and over the flange 18 as shown in Figs. 3 and 8, and the strand is bent sharply and closely back over the tape and on itself as shown in Fig. 8 at 321 to start the first turn 421 of the second layer of winding.

Figure 4:
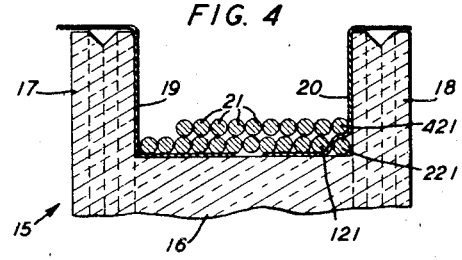
Fig. 4 is a similar view thereof in a still more advanced stage.
Figure 5:
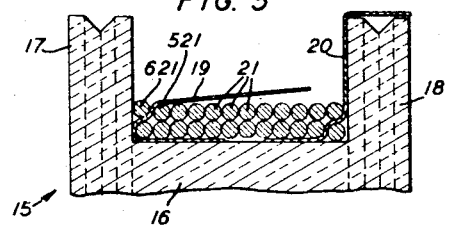
Fig. 5 is a similar view thereof in a yet further advanced stage.

The winding then proceeds, advancing helically toward the left in smoothly juxtaposed clockwise turns, until the next to the last turn 521 is laid on. The tape 19 is then brought down as shown in Fig. 5 and the last turn 621 of the sec- layer of the winding is laid on. The tape 19 is brought back up in the manner indicated for the tape 20 in Fig. 4; and the first turn 721 of the third layer is started by bending the strand sharply and closely back over the tape 19.

Figure 6:
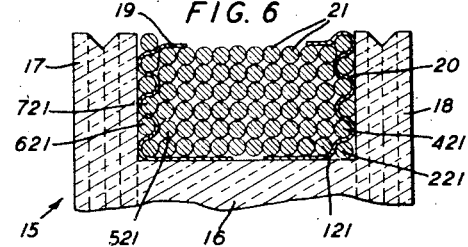
Fig. 6 is a similar view thereof with the winding completed.

This procedure is repeated until as many layers of winding have been laid on as required, producing a finished product such as is shown in Fig. 6.

There are adhesive coated tapes commercially available in the market of practically negligible bulk, e. g. the so-called "Scotch tape" having for a base, an extremely thin and tough tape of cellulose acetate or the like, coated with a suitable adhesive. With such tapes, the local increase of bulk in the winding where the tapes are employed, is negligible, although the loop in the strand where the turnback is made from one direction of winding to the other, is securely anchored in place both vertically and horizontally. Hence, each layer of winding is smooth, even and of exactly the same number of turns as any other layer. Thus it becomes possible to wind a resistance coil of precisely predetermined value of resistance and of negligible inductance; and any two coils similarly wound by this method will have equivalent resistances.

While the method and structure disclosed appear to have their chief application and value in inductionless resistance coils with windings of alternately directed layers, they may also be usefully applied in induction coils, where all layers are of like direction, in which it is desired to have the winding of a coil of accurately predeterminable total length in a predetermined total number of coils. By using the strips 19 and 20, although without bending the strand over them, as in Fig. 8, there will be produced an induction coil in which the terminal turns of each layer are securely anchored in place and the change over of the strand from layer to layer occurs in an accurately regular and predetermined fashion, thus making the number of turns in a layer accurately controllable. In this manner a coil having both predetermined resistance and predetermined inductance can be accurately and repeatedly constructed.

What is claimed is:

1. A method of winding an electrical coil which comprises steps of applying along the barrel and up the flange at either end of a spool a strip of adhesive coated flexible tape, winding a conductor strand along the barrel and over the tape in juxtaposed helical turns until the next to the last turn of a layer has been wound on, folding the tape back over the next to last turn, winding the last turn of the layer into place, and folding the tape forward again over the last turn.

2. A method of winding an electrical coil which comprises steps of applying along the barrel and up the flange at either end of a spool a strip of adhesive coated flexible tape, winding a conductor strand along the barrel and over the tape in juxtaposed helical turns until the next to the last turn of a layer has been wound on, folding the tape back over the next to last turn, winding the last turn of the layer into place, folding the tape forward again over the last turn and continuing the winding with the first turn of a second layer of winding laid directly on the last turn of the first layer and over the tape thereon.

3. A method of winding an electrical coil which comprises steps of applying along the barrel and up the flange at either end of a spool a strip of adhesive coated flexible tape, winding a conductor strand along the barrel and over the tape in juxtaposed helical turns until the next to the last turn of a layer has been wound on, folding the tape back over the next to last turn, winding the last turn of the layer into place, folding the tape forward again over the last turn and bending the conductor strand from the last turn sharply and closely around the tape and back upon itself to form the first turn of a second layer of winding.

4. A method of winding an electrical coil which comprises steps of applying along the barrel and up the flange at either end of a spool a strip of adhesive coated flexible tape, winding a conductor strand along the barrel and over the tape in juxtaposed helical turns until the next to the last turn of a layer has been wound on, folding the tape back over the next to last turn, winding the last turn of the layer into place, folding the tape forward again over the last turn, bending the conductor strand from the last turn sharply and closely around the tape and back upon itself to form the first turn of a second layer of winding, continuing the winding of the second layer until the next to the last turn of the second layer has been laid on, folding the tape at that end of the spool back over the next to the last turn of the second layer into place and folding the tape forward again over the last turn of the second layer.

5. A method of winding an electrical coil which comprises steps of applying along the barrel and up the flange at either end of a spool a strip of adhesive coated flexible tape, winding a conductor strand along the barrel and over the tape in juxtaposed helical turns until the next to the last turn of a layer has been wound on, folding the tape back over the next to last turn, winding the last turn of the layer into place, folding the tape forward again over the last turn, bending the conductor strand from the last turn sharply and closely around the tape and back upon itself to form the first turn of a second layer of winding, continuing the winding of the second layer until the next to the last turn of the second layer has been laid on, folding the tape at that end of the spool back over the next to the last turn of the second layer into place, folding the tape forward again over the last turn of the second layer, and bending the conductor strand from the last turn of the second layer sharply and closely over the tape thereon and back upon itself to form the first turn of a third layer of winding.

6. An electrical coil comprising a support for a winding, and a multi-layered winding of a conductive strand on the support, in combination with a binding tape disposed radially at one end of the winding and passing sinuously around and between radially superimposed turns of consecutive layers of winding in alternately oppositely facing loops.

7. An electrical coil comprising a support for a winding, and a multi-layered winding of a conductive strand on the support, in combination with a binding tape coated with adhesive and disposed radially at one end of the winding and passing sinuously around and between radially superimposed turns of consecutive layers of winding in alternately oppositely facing loops.

8. An electrical coil comprising a support for a winding, and a multi-layered winding of a conductive strand on the support, in combination with a binding tape disposed radially at one end of the winding and passing sinuously around and between radially superimposed turns of consecutive layers of winding in alternately oppositely facing loops, each alternate turn of winding under a loop of the tape being bent back sharply and closely upon itself and into the next loop of the tape as a turn in the opposite direction of winding.

9. An electrical coil comprising a support for a winding, and a multi-layered winding of a conductive strand on the support, in combination with a binding tape coated with adhesive and disposed radially at one end of the winding and passing sinuously around and between radially superimposed turns of consecutive layers of winding in alternately oppositely facing loops, each alternate turn of winding under a loop of the tape being bent back sharply and closely upon itself and into the next loop of the tape as a turn in the opposite direction of winding.

EDWARD C. EARHART.

REFERENCES CITED

The following references are of record in the file of this patent:

UNITED STATES PATENTS

| Number | Name | Date |
|---|---|---|
| 874,023 | McElroy | Dec. 17, 1907 |
| 1,058,825 | Whittlesey | Aug. 15, 1913 |
| 1,155,058 | Hay et al. | Sept. 28, 1915 |

OTHER REFERENCES

Underhill's "Coils and Magnet Wire," 1925 first edition. (Copy in Division 48.)